United States Patent
Brignall et al.

[11] Patent Number: 6,047,473
[45] Date of Patent: Apr. 11, 2000

[54] INLET PORT FLAT WALL SECTION

[75] Inventors: Allan Brignall; Geoffrey Charles Capon, both of Chelmsford, United Kingdom

[73] Assignee: Ford Global Technologies, Inc., Dearborn, Mich.

[21] Appl. No.: 09/217,487

[22] Filed: Dec. 21, 1998

[30] Foreign Application Priority Data

Dec. 24, 1997 [GB] United Kingdom ............. 9727176

[51] Int. Cl.⁷ .................................................. B22D 25/02
[52] U.S. Cl. ................................ 29/888.06; 123/308
[58] Field of Search ............................. 123/306, 308; 29/888.06

[56] References Cited

U.S. PATENT DOCUMENTS 4,873,953  10/1989  Muranaka et al. ................ 123/308
5,557,834   9/1996  Miyanaka et al. ................ 29/888.06
5,855,194   1/1999  Okumura et al. .................. 123/308

FOREIGN PATENT DOCUMENTS 58-135323  11/1983  Japan .................................. 123/308

*Primary Examiner*—Erick R. Solis
*Attorney, Agent, or Firm*—Jerome R. Drouillard

[57] ABSTRACT

A cylinder head for an internal combustion engine of the reciprocating piston type includes a helical inlet port with a flat wall portion in a section of the port upstream of a bowl-shaped recess about a valve stem guide. The flat walled section meets a generally cylindrical portion of the recess adjacent a cusp-shaped swirl edge. The orientation of the flat portion with respect to a reference feature, such as the axis of the valve stem guide, may then be used as a measure of the accuracy of casting of the inlet port, and may also be altered if so desired to vary the swirl characteristics of the inlet port.

6 Claims, 2 Drawing Sheets

INLET PORT FLAT WALL SECTION

FIELD OF THE INVENTION

The present invention relates to a cylinder head for an internal combustion engine of the reciprocating piston type, and in particular to a helical inlet port with a flat wall portion in a section of the port upstream from a swirl edge on a generally cylindrical valve stem recess.

DESCRIPTION OF THE PRIOR ART

Helical inlet ports are commonly used to generate swirl on the gasses entering the cylinder of an internal combustion engine, for example a direct injection diesel engine. The port has an inverted bowl-shaped chamber the rim of which terminates in an annular valve seat. A generally cylindrical valve guide, for the stem of a poppet valve, depends from the roof of the bowl. The bowl is defined by an annular space which extends around the valve guide and which is intercepted, usually tangentially, by the inlet port, in order to generate swirl in the intake gasses as these are admitted to the cylinder.

The junction between the upstream inlet port and the annular space about the cylindrical valve guide is smooth along an outer wall of the port, and has a cusp shape along an opposite inner wall. The cusp has an edge with a radius of more than 1 mm and typically about 3 mm. The cusp acts as a swirl edge, with most of the edge being directed parallel, or within 10° of parallel, to the axis of the valve guide. It has been found experimentally that the shape and angle of the inner wall with respect to the valve stem axis has a significant effect on the degree of swirl. Ideally, this shape and angle should be constant for each cylinder head produced in a production run, in order to ensure the same swirl in each cylinder head. For example, fuel injection equipment is set to deliver a fuel at a certain pressure and droplet size, and for convenience and economy this setting is the same for each engine produced. If the swirl characteristics vary between different cylinder heads, or between different inlet ports in the same cylinder head, then fuel may not be dispersed correctly with the inlet gasses or may settle on surfaces inside the cylinder, such as the combustion bowl piston. This will result in non-optimal combustion and increased emissions. Therefore, swirl ratio is best at a particular nominal value for a particular fuel injection setting.

However, in practice it is difficult to maintain uniformity of the inlet port features in production of a cast cylinder head because the tools, or "boxes" as they are sometimes called, tend to be abraded by sand blown into the tools. The shape of the inner wall of the inlet port can therefore change over time.

As a consequence, in order to optimise fully emission performance, it would necessary, particularly with direct injection diesel or gasoline engines, either to tune each engine individually to meet performance targets, or to attempt to measure the shape and angle of the inlet port inner wall, and to reject cylinder heads that were out of specification. Since this is time consuming and relatively expensive, it has hitherto often been necessary to settle for lower performance on at least some of the engines produced, and hence higher certifiable emissions.

SUMMARY OF THE INVENTION

According to the invention, there is provided a cylinder head for an internal combustion engine of the reciprocating piston type, comprising a helical inlet port with a bowl-shaped chamber which has a rim that terminates in an annular valve seat and which encompasses an annular space about a generally cylindrical valve stem guide for a poppet valve stem, a surface of the bowl meeting one wall of the inlet port along a swirl edge, characterised in that said wall has a flat portion adjacent the swirl edge.

The flat portion may then serve as a measurement surface which may be measured to ensure that the wall upstream and adjacent the swirl edge has the correct angle and orientation with respect to reference features in the cylinder head such as the bowl-shaped chamber, valve seat or valve stem.

Preferably, there is no curved section of inlet port wall immediately adjacent the swirl edge (apart from any radius on the swirl edge itself), and the flat portion extends to meet the swirl edge along most or substantially all of swirl edge. This will help to ensure that if the casting tool changes in the vicinity of the swirl edge, or is worn through use, these changes may be detected by measuring the angle of the flat surface with respect to a reference feature.

In general, a line along most of the swirl edge will be substantially straight, and may be directed within about 10° of parallel to the axis of the poppet valve stem guide.

The flat portion will define a first plane and a first line which lies both in the first plane as well as in a second plane, the second plane being at right angles to the axis of the poppet valve stem guide. The first line may then make an angle of between about 0° and about 20° to a second line, the second line being defined by lying also in the second plane and passing through the axis of the poppet valve stem guide and intersecting the upstream transition between the flat portion and the inlet port wall.

The swirl edge may have an edge with a radius of up to 3 mm. However, it is preferred if the swirl edge has a radius of under 0.5 mm. In a preferred embodiment, the swirl edge is a sharp cusp, for example with a radius of under 0.1 mm. This is because the amount or degree of swirl has been found experimentally to be strongly dependent on the radius of the swirl edge, and in general it is preferred for a given engine if the degree of swirl is constant for each cylinder head produced. It has been found experimentally that, in a typical casting line production process, a sharp edge formed by machining the side of the swirl edge not having the flat portion results in a more reproducible degree of swirl compared with the more rounded edge common with a cast feature.

Also according to the invention, there is provided a method of manufacturing a cylinder head, the cylinder head being according to the invention as described above, in which the method comprises the steps of:

i) casting of the cylinder head in a metal; and ii) measuring the orientation of the flat portion relative to a reference feature to ensure that the flat portion is oriented correctly relative to the reference feature.

Preferably, the reference feature is the axis of the valve stem guide or, equivalently, a surface parallel with this axis.

Optionally, the surface of the swirl edge away from the side having the flat portion, i.e. the downstream portion, may be machined in order to sharpen the edge of the swirl edge, and to this end the downstream side of the swirl edge may be cast with excess material that is later machined away.

BRIEF DESCRIPTION OF THE DRAWINGS

The invention will now be described in more detail, by way of example and with reference to the accompanying drawings, in which.

DETAILED DESCRIPTION OF PREFERRED EMBODIMENT(S)

Figure 1:
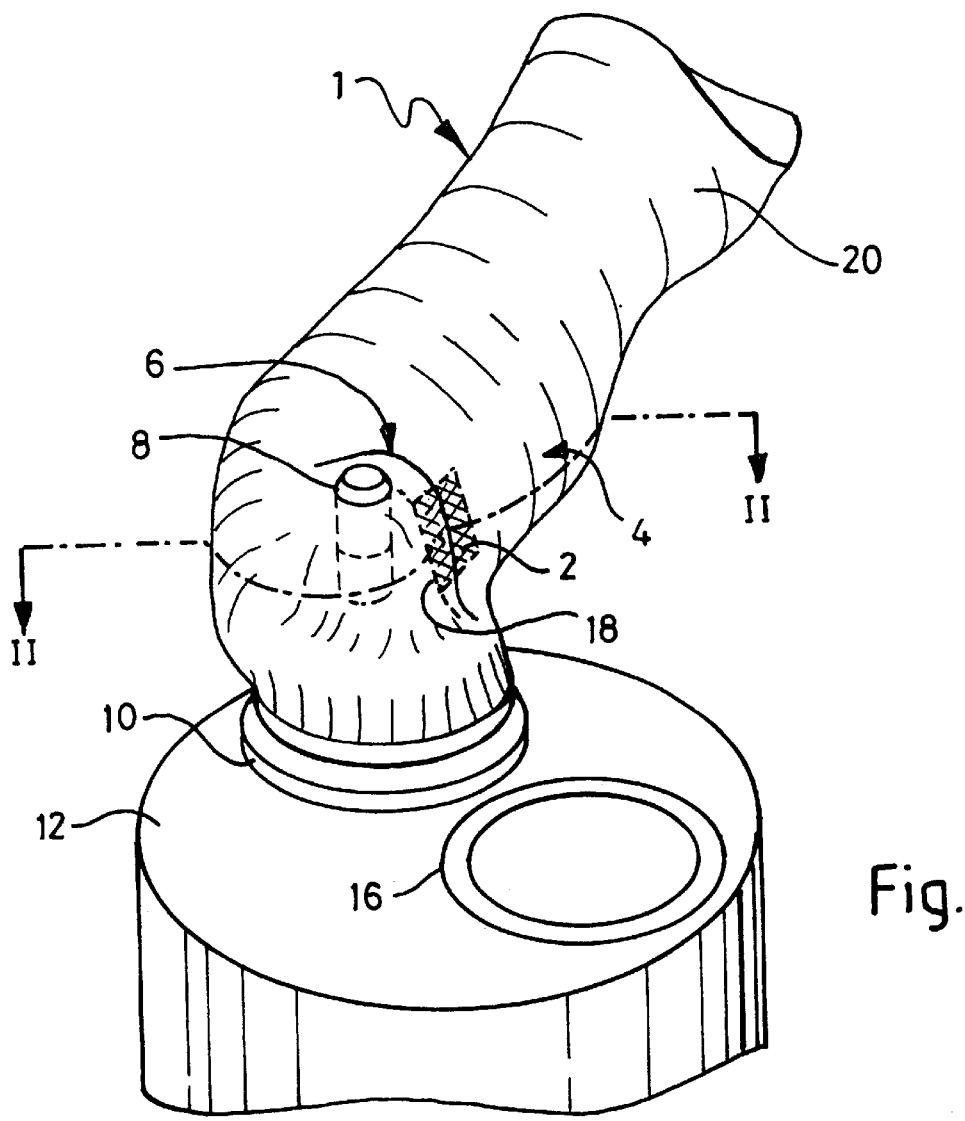
FIG. 1 is a perspective view of the internal surfaces of a helical inlet port in a cylinder head according to the invention, the port having an inverted bowl-shaped chamber around a generally cylindrical valve stem guide above an inlet valve seat.
Figure 2:
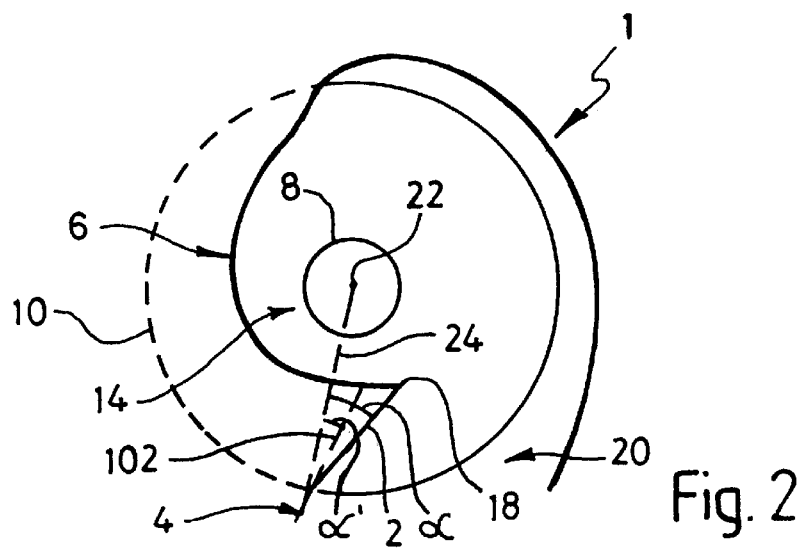
FIG. 2 is a cross section through the cylinder head of FIG. 1, at right angles to the valve stem looking down on the inlet valve seat and showing a wall of the bowl meeting a flat surface in an inlet passage at a swirl edge.

FIGS. 1 and 2 show the internal surfaces of a helical inlet port 1 in a cylinder head. The inlet port 1 has been cast with a flat portion 2 (shown in hashed outline in FIG. 1) in a wall 4 of the inlet port 1. The inlet port 1 has a valve stem recess with an inverted bowl-shaped surface 6 that extends about a valve stem guide 8 which is directed downwardly towards an inlet valve seat 10 in a lower surface 12 of the cylinder head. An annular space 14 extends around most of the valve stem guide 8, broken by an inlet passage 20 which meets the bowl 6 essentially tangentially. For clarity in the drawings, no poppet valve is shown, and no outlet port is shown leading from the cylinder's outlet valve seat 16.

Figure 3:
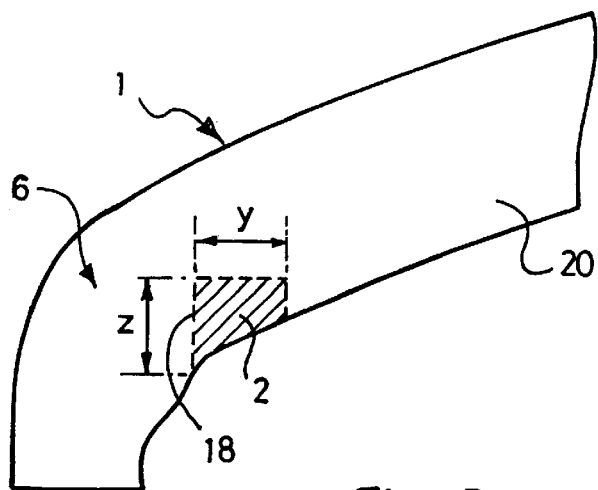
FIG. 3 is a side view of the helical inlet port of FIG. 1, showing the location and dimensions of the flat surface.

With reference to FIG. 3, the dimensions of the flat portion 2 in this example are 15 mm in the y-direction parallel to the base of the cylinder head and at right angles to the engine axis, and a maximum of 20 mm in the z-direction parallel to the cylinder axis.

The flat portion 2 meets a generally cylindrical portion of the bowl-shaped surface 6 at a cusp-shaped swirl edge 18. The swirl edge 18 is therefore straight over most of its length, shown as a dashed line in FIG. 1. The straight portion of the swirl edge is directed about 5° from parallel with an axis 22 of the valve stem guide, tapering outwardly slightly towards the lower end of the swirl edge 18.

The upstream end of the flat portion 2 blends into the wall of the inlet passage along a transition which generally has a small angle. Because the wall is curved in a plane at right angles to the direction of the passage, this small angle varies between about 0° up to about 20° across the transition. It has been found empirically that such small angles do not affect the swirl performance of the helical inlet port.

In a preferred embodiment, the swirl edge 18 has a sharp cusp, as drawn in FIG. 2. Using conventional casting techniques, it is impractical to form a cusp having an edge with a radius shaper than about 1 mm, because the granularity and strength of the sand used in the casting process will not consistently support thin-walled sections. Therefore, in general, swirl edges conventionally have a radius of about 3 mm. The present invention is applicable to such conventional swirl edges.

Because the swirl edge will usually be parallel to the valve stem guide axis to within about 10°, the orientation of the flat portion may be characterised by an angle $\alpha$ defined by a line 24 from the valve stem guide axis 22 to the swirl edge 18, in a plane at right angles to the valve stem guide axis 22, which is here the plane of the drawing. In FIG. 2 this angle is drawn exaggerated in size for clarity, and in general $\alpha$ will be between about 0° and 20°. The angle $\alpha$ may be varied in order to change the degree of swirl. In FIG. 2, a second orientation of a flat portion 102 is shown in dashed outline, with an angle labeled $\alpha'$.

Figure 4:
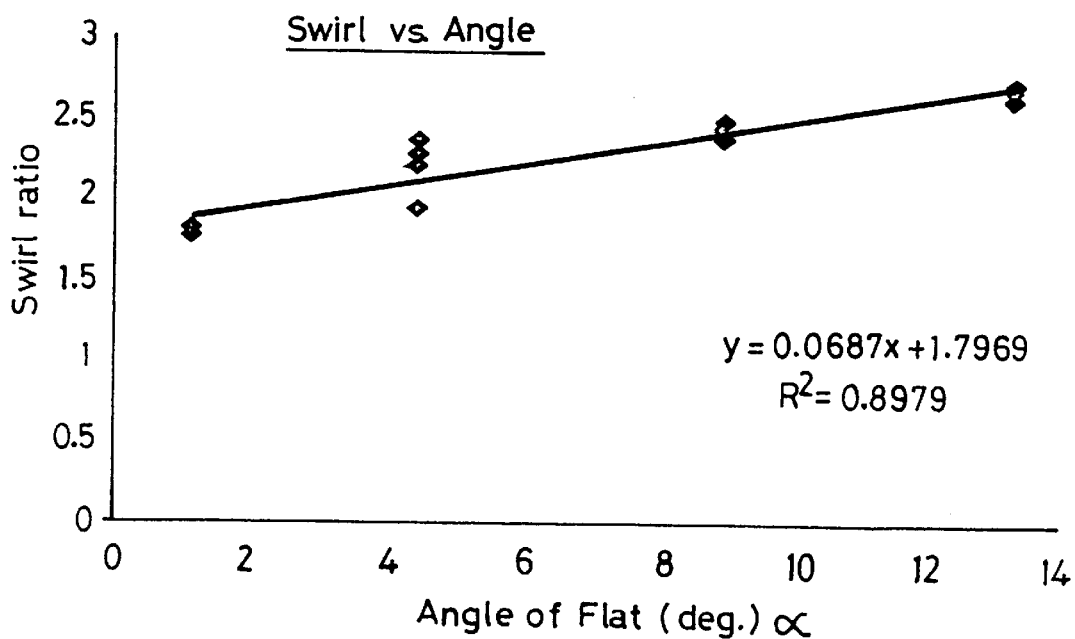
FIG. 4 is a plot showing the degree of swirl versus the angle of the flat surface relative to the axis of the valve stem guide.

FIG. 4 shows quantitatively in terms of a swirl ratio the effect of varying the angle $\alpha$ over the range from about 0° to about 14°. The data presented consists of four sets of data points at each of four angles of flat. The spread within each set of data points can be attributed to experimental error. Swirl ratio here is measured using a well-known technique on a test rig, in which air is sucked into an empty cylinder inside of which a vane anemometer is mounted. The vane is designed to detect the swirl of air about the cylinder axis and so rotates on pivots about this axis. The swirl ratio is calculated as the ratio of the rotation rate of the vane divided by a notional engine rotation rate being that consistent with the volume of air entering the cylinder. Therefore, the greater the swirl ratio, the greater the swirl imparted to air drawn into the cylinder by the helical inlet port.

However, because the combustion characteristics of an engine depend on a number of factors, such as fuel delivery parameters and, for a petrol engine, spark timing, that may need to be same across a range of engines of the same type, it is preferred if each inlet port produces a nominal degree of swirl that does not vary unexpectedly between engines. The orientation of the flat portion is easier to measure than a complex curved shape. The flat portion therefore permits convenient inspection of the shape of the inlet port upstream of the swirl edge to help ensure that the production process is not affected by changes in the tooling used in the casting process.

As noted above, a method of manufacturing a cylinder head according to the present invention includes the steps of casting the cylinder head in a metal, and measuring the orientation of the flat portion relative to a reference feature to ensure that the flat portion is oriented correctly relative to the reference feature. Preferably, the reference feature is the axis of the valve stem guide or, equivalently, a surface parallel with this axis. In an alternative embodiment, the surface of the swirl edge away from the side having the flat portion, i.e. the downstream portion, may be machined in order to sharpen the edge of the swirl edge, and to this end the downstream side of the swirl edge may be cast with excess material that is later machined away.

Although the preferred embodiments of the present invention have been described, it will be apparent to a person skilled in the art that variations may be made to the assembly that is described herein without departing from the scope of the invention as defined in the following claims.

What is claimed is:

1. A method of manufacturing a cylinder head, the cylinder head having a helical inlet port having an inlet passage having a wall with a swirl edge at an end thereof, said inlet port further comprising a bowl-shaped chamber in fluid communication with the inlet passage, the bowl-shaped chamber having a surface, said surface meeting the wall of the inlet port along the swirl edge, said wall having a flat portion adjacent the swirl edge, the method comprising the steps of:

casting the cylinder head; and
   measuring the orientation of the flat portion relative to a reference feature to ensure that the flat portion is oriented correctly relative to the reference feature.

2. A method as claimed in claim 1, in which the reference feature comprises the axis of the valve stem guide.

3. A method according to claim 1 further comprising the step of machining swirl edge adjacent the flat surface to vary the swirl characteristics of the inlet port.

4. A method according to claim 2 further comprising the step of machining the swirl edge adjacent the flat surface to vary the swirl characteristics of the inlet port.

5. A method according to claim 3, further comprising the step of casting the head with an excess material on the swirl edge adjacent the flat surface.

6. A method according to claim 4, further comprising the step of casting the head with an excess material on the swirl edge adjacent the flat surface.

* * * * *